Oct. 14, 1958 W. B. WESTCOTT, JR 2,856,143
COMPRESSIBLE LANDING GEAR CONSTRUCTION
Filed July 18, 1955 2 Sheets-Sheet 1

INVENTOR.
WILLIAM B. WESTCOTT, Jr.
BY
ATTORNEY

INVENTOR.
WILLIAM B. WESTCOTT, Jr
BY
ATTORNEY

United States Patent Office 2,856,143
Patented Oct. 14, 1958

2,856,143

COMPRESSIBLE LANDING GEAR CONSTRUCTION

William B. Westcott, Jr., Cleveland Heights, Ohio, assignor to Cleveland Pneumatic Industries, Inc., Cleveland, Ohio, a corporation of Ohio Application July 18, 1955, Serial No. 522,661

7 Claims. (Cl. 244—102)

This invention relates generally to retractable landing gears and more particularly to a new and improved landing gear which can be compressed when the gear is retracted so that it will fit into a small storage envelope in the air frame.

It is an important object of this invention to provide an aircraft landing gear which is automatically compressed when the landing gear is retracted so that it will fit into a small storage envelope in the aircraft.

It is another important object of this invention to provide an aircraft landing gear incorporating a fluid oleo mechanism utilized to resiliently support the aircraft wherein the oleo mechanism may be easily compressed when the gear is retracted.

It is still another object of this invention to provide a landing gear incorporating a pneumatic spring mechanism wherein the air under pressure is effective over a relatively large area when the landing gear is utilized to support the aircraft and wherein the air under pressure is effective over a substantially smaller area when the landing gear is retracted.

It is still a further object of this invention to provide a landing gear incorporating means which permit the landing gear to be easily compressed.

Further objects and advantages will appear from the following description and drawings, wherein.

Figures 1, 5, 6, 7:
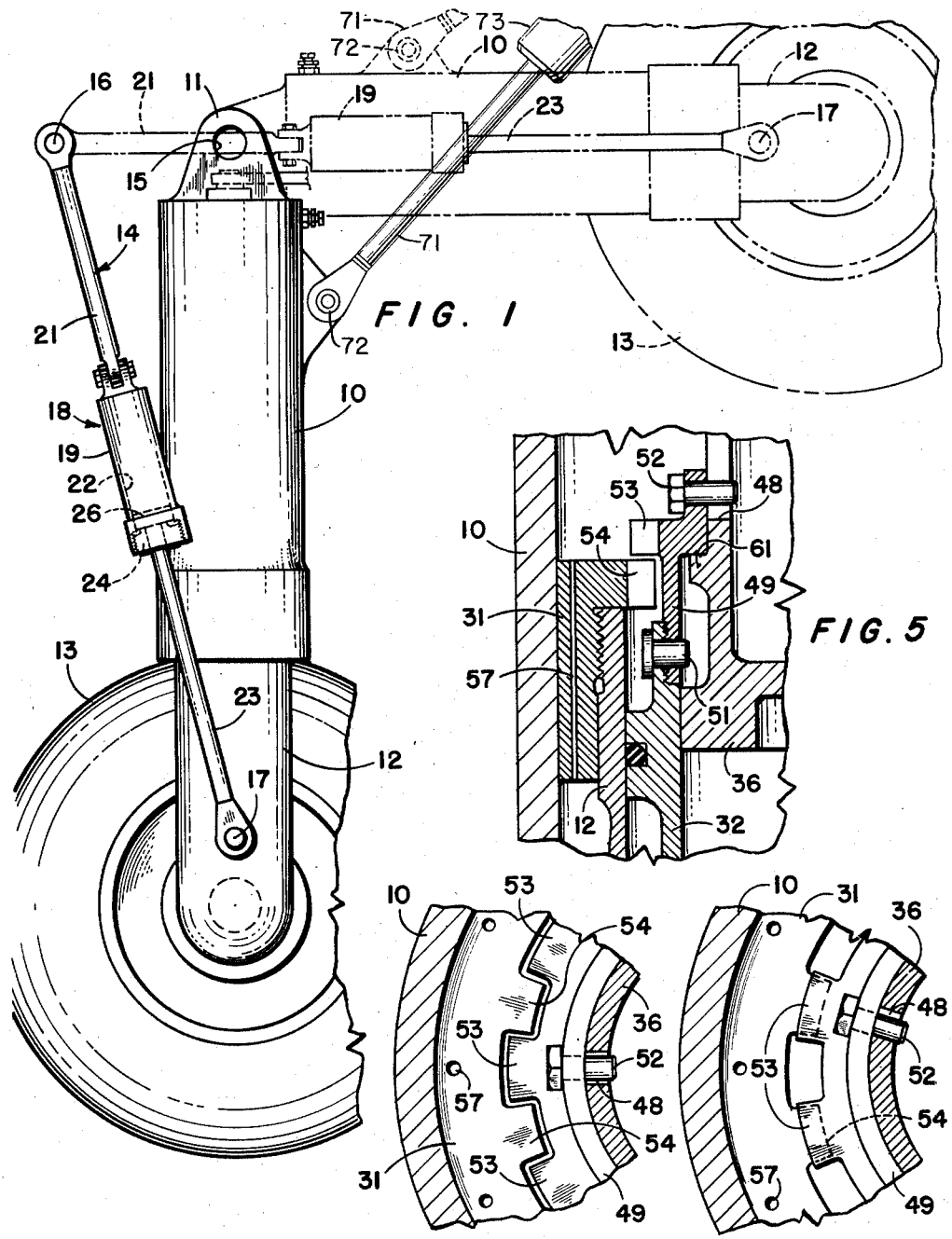
Figure 1 is a side elevation of a landing gear incorporating this invention schematically illustrating the means for compressing the gear which operate during the retraction.
Figure 5 is an enlarged fragmentary section of the locking and release mechanism utilized to permit easy compression of the landing gear.
Figure 6 is a fragmentary cross section taken along 6—6 of Figure 2.
Figure 7 is a cross section similar to Figure 6 showing the position of the elements when the locking mechanism is released to permit easy compression of the landing gear.
Figure 2:
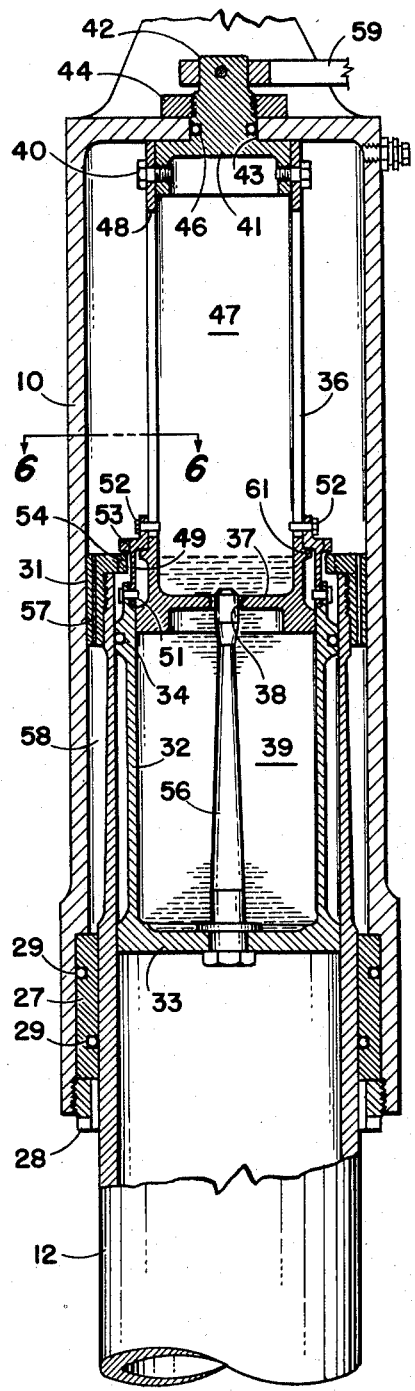
Figure 2 is a fragmentary side elevation in longitudinal section showing the landing gear in the fully extended position.

In modern aircraft the landing gear is normally retracted into the fuselage or wing after take-off to reduce the drag of the ship. It is therefore necessary to provide storage space within the aircraft in which the landing gear is stowed upon retraction. In such aircraft a great deal of equipment must be carried within the fuselage and wings and therefore space is at a premium, so it is desirable to collapse or compress the landing gear as much as possible so that it may be stored in a small space. In the landing gear according to this invention, means are provided to permit the compression of the landing gear without exerting unreasonably large force so that the gear may be stowed in as small a space as possible. A preferred landing gear is provided with an upper telescoping member 10 which is adapted to be mounted on the aircraft by means of a trunnion 11 and a lower telescoping member 12 on which is journaled a ground engaging wheel 13.

Referring to Figures 2 through 7 for a clear understanding of the structure of the strut per se which permits the compression of the strut without exerting large compression forces. A gland member 27 is mounted on the upper telescoping member 10 by a lock nut 28 and provided with fluid seals 29 which prevent leakage of fluid between the gland member 27 and the upper and lower telescoping members 10 and 12. Threaded onto the inner end of the lower telescoping member 12 is a bearing or piston 31 which cooperates with the gland member 27 to prevent lateral motion between the two telescoping members while permitting axial motion therebetween.

A cylinder element 32 provided with a bulkhead 33 at its lower end is mounted for axial motion within the lower telescoping member 12. A resilient seal 34 prevents fluid leakage between the cylinder 32 and the lower telescoping member 12. A plunger tube 36 formed with an inwardly projecting flange 37 which defines a central orifice 38, projects into the cylinder 32 and in cooperation therewith define the variable volume chamber 39 between the bulkhead 33 and the flange 37.

A mounting member 41 is formed with a projection 42 which extends through a central opening 43 formed in the upper telescoping member 10 on which a locking nut 44 is threaded so that the mounting member is axially fixed but rotatable relative to the upper telescoping member 10. A resilient seal 46 prevents leakage of fluid between the projection 42 and the walls of the central opening 43. The upper end of the plunger tube 36 is fixed to the mounting member 41 by bolts 40; therefore the plunger tube 36 is axially fixed and rotatable relative to the upper telescoping member 10. A second chamber 47 is defined by the upper telescoping member 10 on the upper side of the flange 37. It should be understood that the second chamber 47 includes the area between the plunger tube 36 and the upper telescoping member 10 as well as the area within the plunger tube 46 and that fluid connection is provided between these areas by longitudinal slots 48 formed in the plunger tube 36.

A stop member 49 is threaded onto the upper end of the cylinder 32 and locked in place by pins 51. Opposed alignment pins 52 mounted on the stop member 49 project into the slots 48 formed in the plunger tube 36 to prevent relative rotation between the stop member 49 and the plunger tube 36 while permitting relative axial motion therebetween. The stop member 49 is also formed with a plurality of circumferentially spaced teeth 53 best shown in Figures 6 and 7 which cooperate with inwardly extending teeth 54 formed on the bearing member 31 to prevent the stop member 49 from moving downwardly relative to the bearing member when the teeth 53 and 54 are aligned as shown in Figure 6. When the stop member 49 is rotated so that the teeth 53 of the stop member 49 are aligned with the space between the teeth 54 on the bearing member 31, as shown in Figure 7, the bearing member 31 may be moved axially past the teeth 53.

A metering pin 56 is mounted on the bulkhead 33 and projects through the orifice 38 to regulate the flow therethrough and thus provide the shock absorbing action of the strut. The bearing member 31 is preferably formed with the circumferentially spaced small orifices 57 which connect the chamber 47 and a rebound chamber 58 above the gland nut and operate in the normal way to prevent rebounds in landings. When there is no relative movement between the various elements the pressure in the chambers 39, 47 and 58 is equalized and they operate as a single cavity filled with fluid under pressure to provide the fluid spring function.

Figure 3:
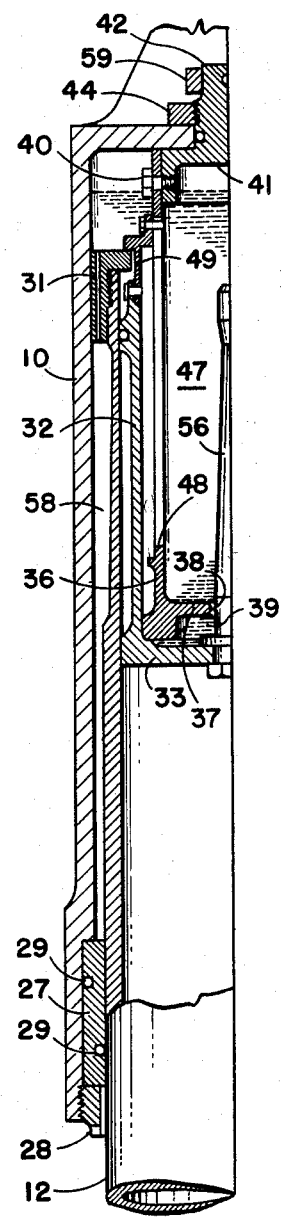
Figure 3 is a fragmentary longitudinal section showing the position of the elements when the landing gear is fully compressed in the normal manner which occurs during the landing of the aircraft.
Figure 4:
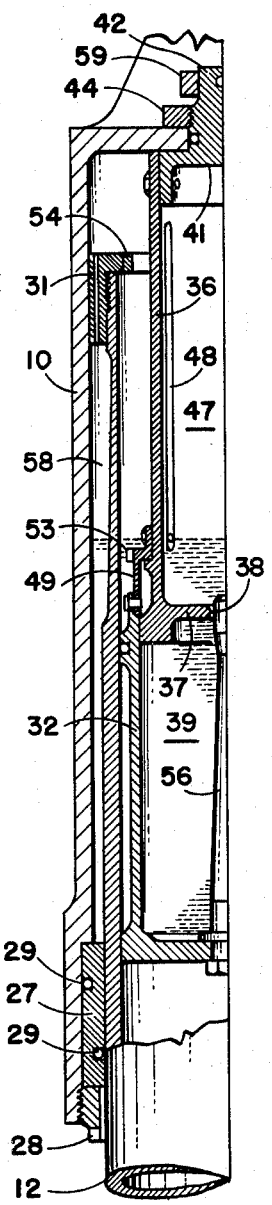
Figure 4 is a fragmentary side elevation in longitudinal section showing the position of the elements when the landing gear is fully compressed for retraction.

When the strut is fully extended, the variable volume chamber 39 and the rebound chamber 58 are completely filled with liquid as is the lower portion of the chamber 47 and the upper portions of the chamber 47 are charged with air under pressure. This creates a pressure on the liquid which produces a reaction force on the cylinder 32 that is a function of the pressure and the effective area of the cylinder 32. The effective area of the cylinder in in this case is equal to the area within the lower telescoping member 12. The fluid under pressure also produces a reaction force directly on the lower telescoping member 12 which is a function of the pressure of the fluid times the projected area of the lower telescoping member 12 between the walls that the seal 34 and the inner seal 29 engage. During normal operation, the stop member 49 is rotated until the teeth 53 are in alignment with the teeth 54 (see Figure 7) so that the bearing member 31 cannot move upwardly past the stop member 49. Therefore, during a landing the impact force is transmitted to the lower telescoping member 12 causing the teeth 53 and 54 to engage so that the cylinder moves upwardly with the telescoping member 12. Thus, the reaction force on the cylinder 32 is transmitted to the lower telescoping member 12 through the teeth 53 and 54 and the weight of the aircraft may be carried by the landing gear. Figure 3 shows the position of the elements after a landing impact when the gear is compressed and illustrates the fact that the cylinder 32 moves upwardly with the lower telescoping member 12 at this time.

When it is desired to compress the landing gear without exerting a large force, as during the retraction of the gear, the mounting member 41 is rotated by a control arm 59. This rotates the plunger tube 36, the stop member 49 and the cylinder 32 through the connection of the pins 52. The members are rotated until the teeth 53 are in alignment with the spaces between the teeth 54 on the bearing member 31 at which time it is possible to move the lower telescoping member 12 upwardly relative to the upper telescoping member 10 without moving the cylinder 32 axially. The plunger tube 36 is formed with a shoulder 61 which engages the stop member 49 when the landing gear is fully extended so that the reaction force on the cylinder 32 is transmitted to the plunger tube and axial clearance is provided between the teeth 53 and 54. This relieves the load on the teeth and permits easy rotation of the stop member 39 and cylinder 32.

When the teeth 53 are in alignment with the spaces between the teeth 54, it is merely necessary to move the lower telescoping member 12 upwardly against the reaction force directly exerted thereon by fluid under pressure. Because the projected area of the lower telescoping member 12 is relatively small compared to the area of cylinder 32 the force necessary to compress the strut at this time is substantially less than the force necessary to compress the strut under landing conditions. Also since the volume of the fluid displaced when the lower telescoping member 12 is moved upwardly by itself is substantially smaller than the volume displaced when the cylinder member 32 moves with the lower telescoping member 12, the pressure within the chambers 47 and 39 does not build up to increase the reaction force. By comparing Figures 3 and 4, those skilled in the art will recognize that when the lower telescoping member 12 moves independent of the cylinder member 32 the air in the chamber 47 is not compressed appreciably so the reaction force on the lower telescoping member per se will not build up to a high value. No problem is presented in extending the strut since the reaction force on the lower telescoping member 12 is sufficient to overcome friction of the bearings.

Referring to Figure 1, any suitable actuator having a piston 71 pivoted to the upper telescoping member 10 as shown at 72, and a cylinder 73 carried by the aircraft can be used to move the landing gear between the extended position and the retracted position. An operating mechanism 14 is pivoted at its upper end to the aircraft at a point 16 spaced from a pivot bore 15 formed on the trunnion 11 and its lower end to the lower telescoping member 12 as at 17. The operating mechanism is provided with a collapsible portion 18 which prevents it from transmitting a compression load but permits it to transmit a tension load. To provide this connection, a cylinder 19 is connected to an upper link 21 and provided with an axial bore 22 adapted to receive the upper end of a lower link 23. A cap member 24 is threaded onto the end of the cylinder 19 and is proportioned to engage a head 26 formed on the lower link 23 and prevents the head from moving out of the cylinder 19. In normal landings, motion of the lower telescoping member 12 upwardly merely causes the lower link 23 to move axially into the cylinder 19 and causes the head to move upwardly within the bore 22. However, the head 26 is proportioned to engage the cap 24 when the landing gear is fully extended and prevents the operating mechanism from extending beyond the position shown in Figure 1. Therefore, the operating mechanism will not interfere with the normal operation of the landing gear but is capable of producing a force to compress the gear when it is retracted. A comparison of the extended position and the retracted position shown in phantom in Figure 1 clearly shows the operation upon retraction. When the gear is retracted by a retraction mechanism (not shown) to the position shown in phantom, the operating mechanism produces a force on the lower telescoping member 12 which pulls it upwardly toward the upper telescoping member 10 to the compressed position. By utilizing this operating mechanism no power source other than the power source of the retraction mechanism is necessary to compress the gear as it is retracted.

A strut incorporating this invention having a normal compression force load rating of 30,000 pounds can be compressed for retracting with a force in the order of 1000 pounds. It is therefore obvious that the compressing mechanism may be light weight while still providing sufficient strength to function properly.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A landing gear comprising a pair of telescoping members, an element rotationally and axially movable in one of said members, said telescoping members and element cooperating to define a cavity filled with pressure fluid acting on said element to produce a first reaction force urging said element in one direction relative to said members and acting on said one member to produce a second reaction force urging said one member axially relative to said element and the other of said members in said one direction, said one member being formed with a plurality of radially extending circumferentially spaced first stop surfaces, said element being formed with a plurality of radially extending circumferentially spaced second stop surfaces proportioned to engage said first stop surfaces and limit relative axial motion between said one member and element when said one member and element are in a first position of angular alignment and disengage said first surfaces and permit relative axial motion between said element and one member when they are in a second position of angular alignment, and means mounted on said other member and connected to said element for producing relative rotation between said one member and element between said first and second positions.

2. A landing gear comprising first and second telescoping members capable of relative axial motion, a cylinder element slidable in said first member, said telescoping members and cylinder element cooperating to define a cavity filled with pressure fluid urging said cylinder element and first member axially relative to said second member in one direction, a plunger tube axially fixed and rotatable relative to said second member, connecting means between said plunger tube and cylinder element preventing relative rotation and permitting relative axial motion therebetween, cooperating means operably connected to said plunger tube for rotating said plunger tube and cylinder element from a first to a second position, and cooperating stop means operably connected between said first member and cylinder element limiting axial motion of said first member relative to said cylinder element in a direction opposite to said one direction when said cylinder element is in said first position and permitting relative axial motion therebetween in said opposite direction when said cylinder element is in said second position.

3. A landing gear comprising inner and outer telescoping members capable of relative axial motion, one of said members being adapted to be mounted on an aircraft and a ground engaging wheel on the other of said members, a cylinder element slidable in said inner member, said telescoping members and cylinder element cooperating to define a cavity filled with pressure fluid urging said cylinder element and inner member axially relative to said outer member in one direction, a plunger tube axially fixed and rotatable relative to said outer element, connecting means between said plunger tube and cylinder element preventing relative rotation and permitting relative axial motion therebetween, cooperating means operably connected to said plunger tube for rotating said plunger tube and cylinder element from a first to a second position of angular alignment, cooperating stop means operably connected between said inner member and cylinder element limiting relative axial motion of said inner member relative to said cylinder element in a direction opposite said one direction when said cylinder element is in said first position and permitting relative axial motion therebetween when said cylinder element is in said second position, and damping means on said cylinder element cooperating with said plunger tube to resist axial motion between said members.

4. A landing gear comprising inner and outer telescoping members capable of relative axial motion and adapted to be mounted on an aircraft for motion between and an extended and a retracted position, a cylinder element slidable in said inner member, said telescoping members and cylinder element cooperating to define a cavity filled with fluid under pressure urging said cylinder element and inner member axially relative to said outer member in one direction, a plunger tube axially fixed and rotatable relative to said outer element, connecting means between said plunger tube and cylinder element preventing relative rotation and permitting relative axial motion therebetween, cooperating means operably connected to said plunger tube for rotating said plunger tube and cylinder member between a first and second position, cooperating stop means operably connected to said inner member and cylinder element limiting relative axial motion of said inner member relative to said cylinder element in a direction opposite said one direction when said cylinder element is in said first position and permitting relative axial motion therebetween when said cylinder element is in said second position, and means connected to said inner member for moving said inner member axially in said one direction relative to both said outer member and cylinder element when said cylinder element is in said second position and said lower telescoping member moves to said retracted position.

5. A landing gear comprising a pair of telescoping members axially movable relative to each other between an extended position and a compressed position, an element axially movable in one of said members, said members and element cooperating to define a cavity filled with pressure fluid acting on said element to produce a reaction force urging it axially in one direction relative to said members, a stop surface on said element movable relative to said one member between an engagement position and a released position, said stop surface engaging said one member and preventing axial motion of said element relative thereto in said one direction during movement of said member between said extended position and said compressed position only when said stop surface is in said engagement position, and means carried by said members connected to said stop surface operable to effect movement thereof between said engagement position and said released position.

6. A landing gear comprising a pair of telescoping members axially movable relative to each other between an extended position and a compressed position, an element axially movable and rotatable in one of said members, said members and element cooperating to define a cavity filled with pressure fluid acting on said element to produce a reaction force urging it axially in one direction relative to said members, a stop surface on said element rotatably movable relative to said one member between an engagement position and a released position, said stop surface engaging said one member and preventing axial motion of said element relative thereto in said one direction during movement of said member between said extended position and said compressed position only when said stop surface is in said engagement position, and rotary means carried by said members connected to said stop surface operable to effect movement thereof between said engagement position and said released position.

7. A landing gear comprising a pair of telescoping members axially movable relative to each other between an extended position and a compressed position, an element axially movable relative to one of said members, said element and members cooperating to define a cavity filled with pressure fluid, said pressure fluid acting on said element to produce a reaction force urging it axially in one direction relative to said members, a first radially extended stop surface carried by said element, a second radially extended stop surface carried by said one member, one of said stop surfaces being movable between an engagement position wherein it is aligned with the other of said stop surfaces for mutual engagement to prevent relative axial movement between said one member and element in said one direction as said one member moves between said extended position and said compressed position, and a released position wherein it is clear of said other stop surface and permits relative axial movement between said element and one member, and an operator external of said telescoping members operably connected to said one stop surface operable to move said stop surface between said engagement position and said released position.

References Cited in the file of this patent

UNITED STATES PATENTS

| | | |
|---|---|---|
| 2,260,290 | Brie | Oct. 28, 1941 |
| 2,363,485 | Down | Nov. 28, 1944 |
| 2,390,661 | Parilla | Dec. 11, 1945 |
| 2,478,729 | Westcott | Aug. 9, 1949 |
| 2,563,518 | Dickerman | Aug. 7, 1951 |
| 2,735,674 | Smith et al. | Feb. 21, 1956 |